(12) United States Patent
Juarez

(10) Patent No.: US 11,371,292 B2
(45) Date of Patent: *Jun. 28, 2022

(54) THREADFORM HAVING CREST TO ROOT THREAD COMPOUND RELIEF AREAS

(71) Applicant: HYDRIL COMPANY, Houston, TX (US)

(72) Inventor: Alejandro Juarez, Cypress, TX (US)

(73) Assignee: HYDRIL COMPANY, Houston, TX (US)

( * ) Notice: Subject to any disclaimer, the term of this patent is extended or adjusted under 35 U.S.C. 154(b) by 373 days.

This patent is subject to a terminal disclaimer.

(21) Appl. No.: 16/227,353

(22) Filed: Dec. 20, 2018

(65) Prior Publication Data

US 2019/0195029 A1 Jun. 27, 2019

Related U.S. Application Data

(60) Provisional application No. 62/608,905, filed on Dec. 21, 2017.

(51) Int. Cl.
*E21B 17/042* (2006.01)
*F16L 15/08* (2006.01)
*F16L 15/06* (2006.01)
*F16L 15/00* (2006.01)

(52) U.S. Cl.
CPC .......... *E21B 17/042* (2013.01); *F16L 15/006* (2013.01); *F16L 15/06* (2013.01); *F16L 15/08* (2013.01); *F16L 15/001* (2013.01)

(58) Field of Classification Search
CPC ........ F16L 15/06; F16L 15/006; E21B 17/042

USPC ................................... 285/333, 334
See application file for complete search history.

(56) References Cited

U.S. PATENT DOCUMENTS

| 2,177,100 | A | | 9/1938 | Frame |
| 2,827,313 | A | | 11/1954 | Conner |
| RE30,647 | E | | 6/1981 | Blose |
| 4,600,224 | A | | 7/1986 | Blose |
| 4,830,411 | A | * | 5/1989 | Tsuru ..................... E21B 17/042 285/334 |

(Continued)

OTHER PUBLICATIONS

Patent Cooperation Treaty; PCT/US2018/066812, International Search Report and Written Opinion, dated Mar. 4, 2019.

(Continued)

*Primary Examiner* — Zachary T Dragicevich
(74) *Attorney, Agent, or Firm* — Morgan, Lewis & Bockius LLP

(57) ABSTRACT

A connection includes a first tubular member having a first screw threadform defined by a first plurality of crests, roots, and flanks, where each flank separates each crest from each root. The connection also includes a second tubular member having a second screw threadform defined by a second plurality of crests, roots, and flanks, where each flank separates each crest from each root. The crests and roots are substantially axial to the tubular members and the flanks are substantially radial to the tubular members. The first tubular member and the second tubular member are configured to connect when the first threadform engages with the second threadform. Thread compound relief spaces are formed between the first plurality of crests and the second plurality of roots when the first and second tubular members connect.

6 Claims, 6 Drawing Sheets

(56) References Cited

U.S. PATENT DOCUMENTS

| | | | |
|---|---|---|---|
| 5,931,511 A * | 8/1999 | DeLange | E21B 17/042 |
| | | | 285/334 |
| 6,050,610 A | 4/2000 | Enderle et al. | |
| 7,458,616 B2 | 12/2008 | Reynolds, Jr. | |
| 7,717,478 B2 | 5/2010 | Reynolds, Jr. | |
| 7,810,849 B2 | 10/2010 | Reynolds, Jr. | |
| 2002/0074799 A1 | 6/2002 | Watts | |
| 2004/0104575 A1* | 6/2004 | Ellington | E21B 17/042 |
| | | | 285/333 |
| 2004/0195835 A1* | 10/2004 | Noel | F16L 15/06 |
| | | | 285/333 |
| 2006/0145480 A1 | 7/2006 | Mallis et al. | |
| 2006/0261595 A1* | 11/2006 | Verger | 285/334 |
| 2007/0176423 A1 | 8/2007 | Reynolds, Jr. | |
| 2012/0038147 A1 | 2/2012 | Mallis et al. | |
| 2012/0049514 A1* | 3/2012 | Granger | E21B 17/042 |
| 2016/0186899 A1* | 6/2016 | Besse | E21B 17/042 |
| 2016/0281440 A1* | 9/2016 | Sugino | F16L 15/06 |
| 2017/0122468 A1* | 5/2017 | Sugino | E21B 17/042 |
| 2017/0146160 A1 | 5/2017 | Banker | |

OTHER PUBLICATIONS

European Sarch Report; Appn: 18891838.7-1002 / 3728923; PCT/US2018/066835.

* cited by examiner

THREADFORM HAVING CREST TO ROOT THREAD COMPOUND RELIEF AREAS

TECHNICAL FIELD

The present application relates to tubular connections, and more particularly, to a tubular connection threadform having crest to root thread compound cavities.

BACKGROUND

This section is intended to introduce various aspects of art that may be related to various aspects of the present techniques, which are described and/or claimed below. This discussion is believed to be helpful in providing background information to facilitate a better understanding of the various aspects of the present disclosure. Accordingly, it should be understood that these statements are to be read in this light, and not as admissions of prior art. The following descriptions and examples are not admitted to be prior art by virtue of their inclusion in this section.

The oil and gas industry is drilling upstream production wells of increasing depth and complexity to find and produce raw hydrocarbons. The industry routinely uses steel pipe, considered an Oil Country Tubular Good (OCTG) to protect the borehole (i.e., casing) and to control the fluids produced within the pipe (i.e., tubing). Such pipes, including casing and tubing, are made and transported in relatively short segments and installed in the borehole one segment at a time, with each segment being connected to the next. As the search for oil and gas has driven companies to drill deeper wells, pipes may be subject to increased complexity and magnitude of forces throughout their lifespans downhole. Industry demands have grown for casing, tubing, and connectors having increased tensile and pressure strengths. Furthermore, the developing area of deviated and horizontal wells have exacerbated this trend, further adding increased torsional loads as another requirement for casing and tubing connectors.

Connectors have been designed with varying thread, shoulder, and seal configurations. For example, two general connector thread configurations include a threaded and coupled connector and an integral connector. A threaded and coupled connector includes a pin (i.e., a male threaded end) machined on relatively long joints of pipe and joined by a box (i.e., a female threaded end) machined on a relatively short coupling. An integral connector includes a pin threaded on a full-length pipe connected to a box threaded on another full-length pipe, and pin and box ends may be threaded onto opposite sides of each full-length pipe segment so that each segment may be connected for a length of a borehole. The various connection configurations may involve applying a thread compound to the pin and box threads as they are joined together. This thread compound, sometimes referred to as pipe dope or thread dope, may provide lubrication as pipes or connections are assembled and may fill voids between threads.

As industry demands connectors with increasingly high tensile strength, pressure strength, and torque, etc., the general features of connectors may be designed and engineered to meet downhole performance criteria. Connectors may be further designed to incorporate intentional voids for containing thread compound while meeting high performance criteria.

Prior efforts have to been made to design connectors with voids to contain thread compound. For example, U.S. Pat. No. 7,717,478 discloses a design with a plurality of "interruptions" spaced periodically along the thread form, but (at column 10, line 63—column 11, line 10) expressly teaches away from a connector that includes a void for containing thread compound that extends from one end of the thread helix to the other.

Similarly, U.S. Pat. No. 7,810,849 discloses "perturbations" that create "localized" areas of reduced clearance that may serve as a void for containing thread compound. However, this patent also discloses (at column 11, lines 59-62) that "it may be undesirable to constructs [sic] a threaded connection with interference or reduced clearance throughout the entire connection because such a construction may lead to premature failure of the connection."

Accordingly, there is a need for a connector with an intentional void for containing thread compound, wherein the void extends along the entire axial length of the threadform, so as to maximize the volume of thread compound that can be accommodated. This configuration helps to avoid hydraulic locking, which may occur when the void has insufficient volume to accommodate all of the thread compound that was applied. Hydraulic locking may cause problems because it can lead to inaccurate torque readings, which may interfere with both assembly and disassembly of the connector.

Alternatively, an increased volume of thread compound may be accommodated by a plurality of voids between each corresponding pair of thread roots and thread crests—but not both—along the entire axial length of the threadform.

Extending the void along the entire axial length of the threadform can provide other benefits, as well. For example, it is generally easier to machine this configuration, as compared to a threadform that only includes a void along a portion of its axial length. In addition, if thread compound is applied unevenly along the axial length of the threadform, extending the void along the entire axial length provides more flexibility to accommodate uneven application than a configuration that only includes a void along a portion of its axial length.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one embodiment, a connection includes a first tubular member having a first screw threadform defined by a first plurality of crests, a first plurality of roots, and a first plurality of flanks, where each flank separates each crest from each root. The first plurality of crests and roots are substantially axial to the first tubular member while the first plurality of flanks are substantially radial to the first tubular member. The connection also includes a second tubular member having a second screw threadform defined by a second plurality of crests, a second plurality of roots, and a second plurality of flanks, where each flank separates each crest from each root. The second plurality of crests and roots are substantially axial to the second tubular member and the second plurality of flanks are substantially radial to the second tubular member. The first tubular member and the second tubular member are configured to connect when the first threadform engages with the second threadform. Thread compound relief spaces are formed between each of the first plurality of crests and each of the second plurality of roots, throughout the axial length of the first and second screw threadforms. In some embodiments, a contact region forms between a portion of the first plurality of flanks and a portion of the second plurality of flanks when the first and second tubular members connect. In some embodiments, the thread compound relief spaces are formed by making the axial height of the first plurality of flanks less than the axial height of the second plurality of flanks In some embodiments, the first tubular member has a pin end and the second tubular member has a box end, and the thread compound relief spaces are formed between crests of the pin end and roots of the box end. The thread compound relief spaces may have an axial height that is 5% to 40% of an axial height of the first plurality of flanks, 5% to 40% of an axial height of the second plurality of flanks, or both. In some embodiments where the thread compound relief spaces are formed between crests of the pin end and roots of the box end, the first plurality of flanks have an axial height that is 60% to 95% of an axial height of the second plurality of flanks, the second plurality of flanks have an axial height that is 60% to 95% of an axial height of the first plurality of flanks, or both.

In some embodiments, additional thread compound relief spaces are formed between each of the first plurality of roots and each of the second plurality of crests, throughout the axial length of the first and second threadforms, such that the thread compound relief spaces combine to form a substantially continuous void between the corresponding roots and crests throughout the axial length of the first and second screw threadforms. In these embodiments, the thread compound relief spaces comprise an axial height that is 5% to 40% of an axial height of the first plurality of flanks, 5% to 40% of an axial height of the second plurality of flanks, or both. In some embodiments where the thread compound relief spaces are formed between crests of the pin end and roots of the box end and the roots of the pin end and the crests of the box end, the first plurality of flanks have an axial height that is 60% to 95% of an axial height of the second plurality of flanks, the second plurality of flanks have an axial height that is 60% to 95% of an axial height of the first plurality of flanks.

The invention may also comprise a method for forming a tubular connection like that described above, wherein the method comprises applying thread compound to the first screw threadform of the first tubular member and rotating one of the first tubular member and the second tubular member relative to each other, such that the first screw threadform engages with the second screw threadform. Thread compound may also be applied to the second screw threadform as part of this method.

In another embodiment, a method includes moving a first tubular member relative to a second tubular member, such that a pin end of the first tubular member enters and axially overlaps with a box end of the second tubular member. The method further includes rotating the first tubular member relative to the second tubular member, such that a first threading on the first tubular member engages with a second threading on the second tubular member. The method then includes connecting the first tubular member to the second tubular member, such that a length of box threading of the box end substantially covers a length of pin threading of the pin end. The pin threading includes pin crests and pin roots that are substantially axial to the first tubular member, where the pin crests and pin roots are each separated by pin flanks that are substantially radial to the first tubular member. The box threading includes box crests and box roots that are substantially axial to the second tubular member, where the box crests and box roots are each separated by box flanks that are substantially radial to the second tubular member. A thread compound relief space forms between the pin crests and the box roots once the first and second tubular members are connected.

In some embodiments, the method further comprises disposing thread compound on one or both of the pin end of the first tubular member and the box end of the second tubular member. The thread compound relief space is suitable for containing the thread compound. Furthermore, in some embodiments, connecting the first tubular member to the second tubular member includes contacting a portion of pin flanks to a portion of box flanks. The contacting portion may include interfering contact between a portion of the pin threading and a portion of the box threading. Additionally, in some embodiments, connecting the first tubular member to the second tubular member comprises contacting pin crests with box roots and contacting box crests with pin roots along only a portion of a length of the pin end and a corresponding length of the box end.

BRIEF DESCRIPTION OF THE DRAWINGS

Embodiments of the present techniques are described with reference to the following figures. The same numbers are used throughout the figures to reference like features and components. Various embodiments may utilize elements and/or components other than those illustrated in the drawings, and some elements and/or components may not be present in various embodiments. Elements and/or components in the figures are not necessarily drawn to scale.

DETAILED DESCRIPTION

Tubular connectors generally include tubular segments that are connected when a tubular segment having a male threaded pin end is connected with another tubular segment having a female threaded box end. The pin and box are designed to be joined together such that the tubular segments are sealed to prevent the passage of liquid or gas across the threads of the assembled connection. The process of joining the pin and box together, sometimes referred to as make-up, may involve applying a thread compound to the pin and box threads in preparation of assembling one tubular member having a pin end with another tubular member having a mating box end. The thread compound, sometimes referred to as pipe dope or thread dope, may provide lubrication during make-up and may also fill voids between the pin and box threads.

Figure 1:
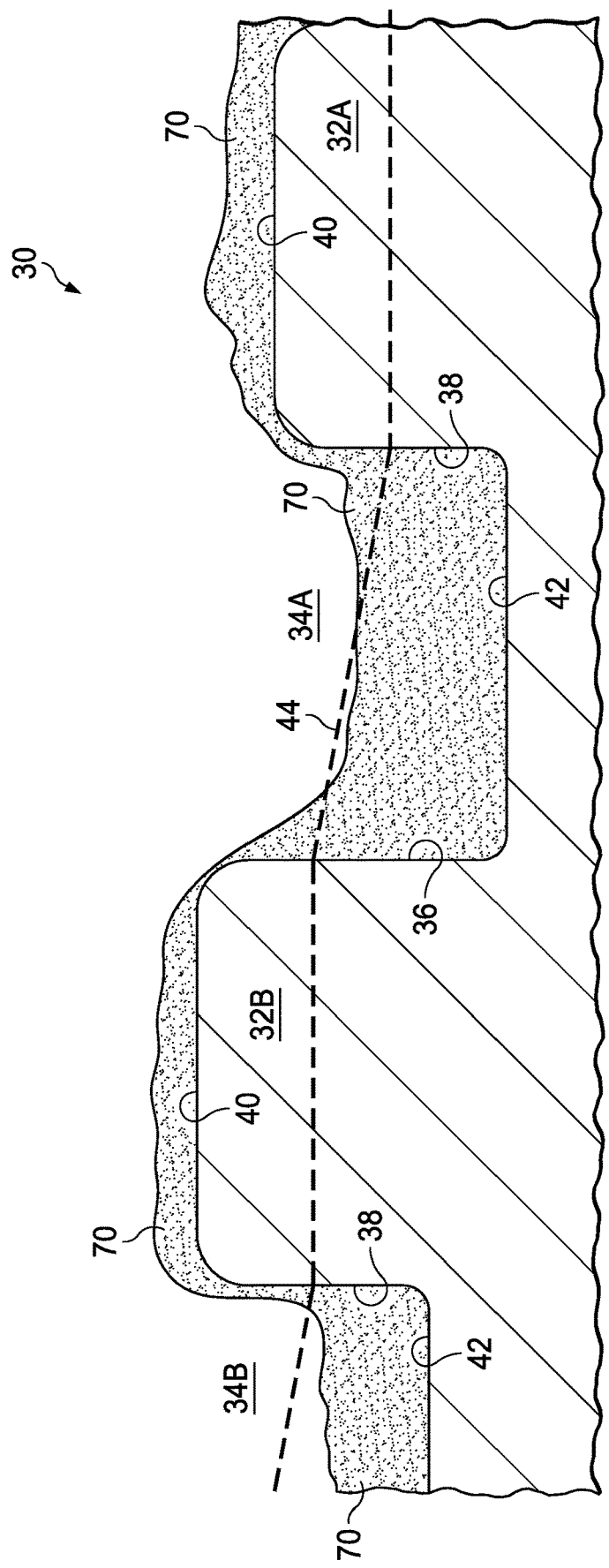
FIG. 1 is a schematic view a threadform having two ridge segments and two groove segments.

The schematic diagram of FIG. 1 shows a partial profile 30 of a threadform having two ridge segments 32 *a*, 32 *b* and two groove segments 34 *a*, 34 *b*. The threadform utilizes a square or near-square form having a stab-flank 36 and load-flank 38 extending between crest 40 and root 42. The pitch-line 44 is shown in dashed line form. Thread compound 70 may be applied to the threadform of a tubular member in preparation of assembling one tubular member with another. It may be recommended to apply a certain amount of thread compound 70; for example, a connection manufacturer may recommend applying thread compound 70 such that it reaches one-third of the height of the ridges 32. However, in practice, operators may not always carefully control how much thread compound 70 is applied, and may often apply more than the recommended amount. The amount of thread compound 70 depicted in the drawings of present disclosure is representative only of an amount of thread compound 70 which may be applied during operation.

Referring now to FIGS. 2-5, a tubular connection make-up sequence is depicted for a representative pin member 80 and box member 82, both shown only in partial cross-section. The make-up sequence may involve rotating one member, for example, the pin member 80, towards and with respect to the other member, for example, the box member 82. The make-up sequence may further involve the application of thread compound 70, which may be compressed and/or displaced between the pin member 80 and box member 82 during make-up. While the thread compound 70 is depicted as disposed over the pin member 80, it should be noted that thread compound 70 is sometimes applied to either the pin member 80, the box member 82, or both, in various quantities.

Figure 2:
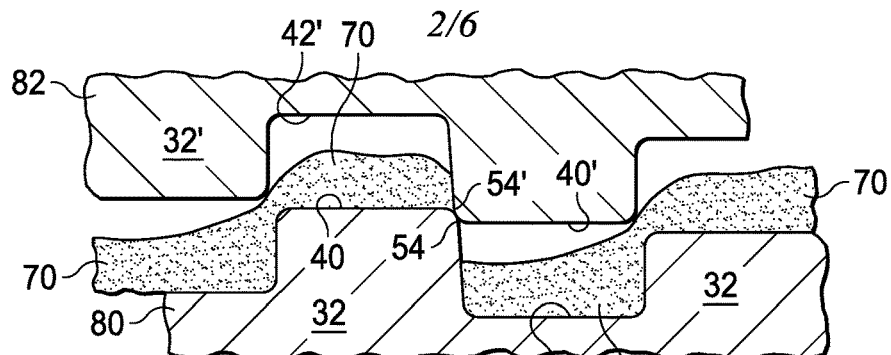
FIGS. 2-5 are schematic views of threads during the makeup sequence of members.
Figure 3:
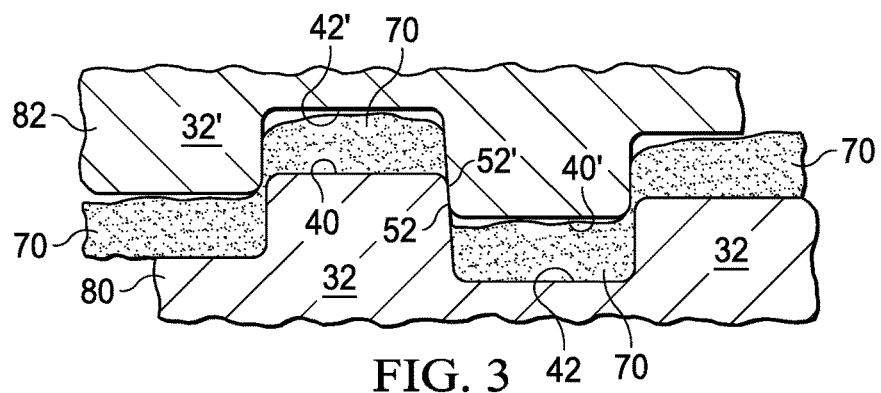
Figure 4:
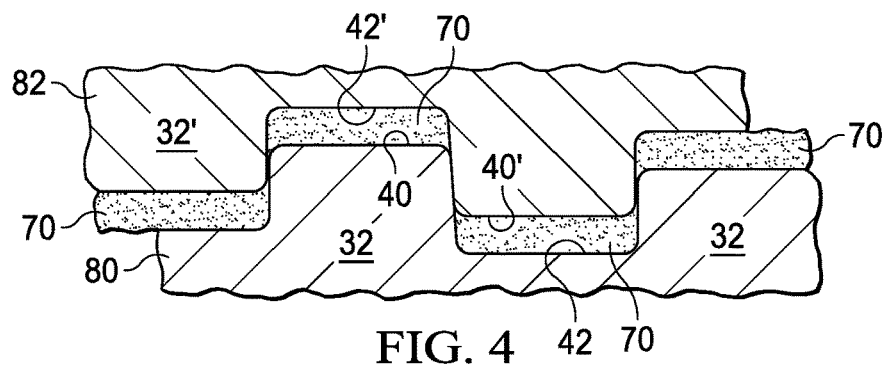

During the first turn, as depicted in FIG. 2, stab flank engagement is between the clearance surfaces 54, 54' of the two threaded members, and thread compound 70 may be disposed between the crest 40 of the pin 80 and root 42' of the box 82 and/or between the root 42 of the pin 80 and crest 40' of the box 82. The load flanks may be drawn closer together as the thread is rotated into closer engagement. If the thread of the members has a cam surface 52, 52', as shown, as the threaded assembly enters its second turn as shown in FIG. 3, stab flank contact shifts from the clearance surfaces 54, 54' to the cam surfaces 52, 52'. If not, assembly during the second turn remains on the clearance flank. At this point, the thread compound 70 may be touching or almost filling the clearance between the crest 40 of the pin 80 and root 42' of the box 82 and/or between the root 42 of the pin 80 and crest 40' of the box 82. Rotation of one member into the other member decreases the clearance between load flanks. In the example illustrated in FIG. 4, at the end of the second turn, the clearance is almost closed. Thread compound 70 may be compressed in the clearance between the crest 40 of the pin 80 and root 42' of the box 82 and/or between the root 42 of the pin 80 and crest 40' of the box 82.

Figure 5:
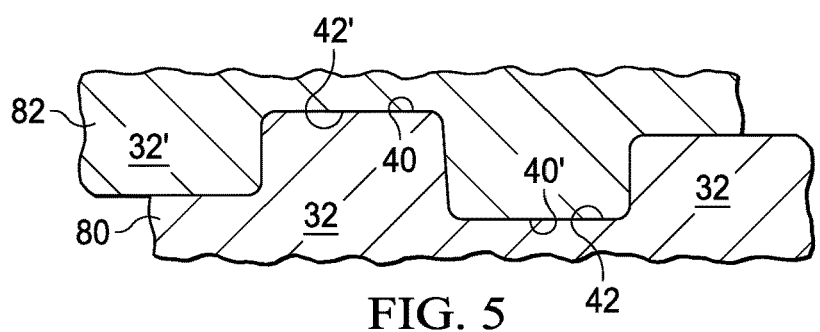

As the connection enters its third turn, the thread groove and thread ridge's load flanks engage, or are moved closer together, as depicted in FIG. 5. As the connection continues to be engaged, the base surface of the stab flank and the load flank continue to slide upon the respective mating surfaces until the root and crests of the thread engage. Thread compound 70 may be compressed in the small clearances and voids between the pin 80 and box 82.

Figure 6:
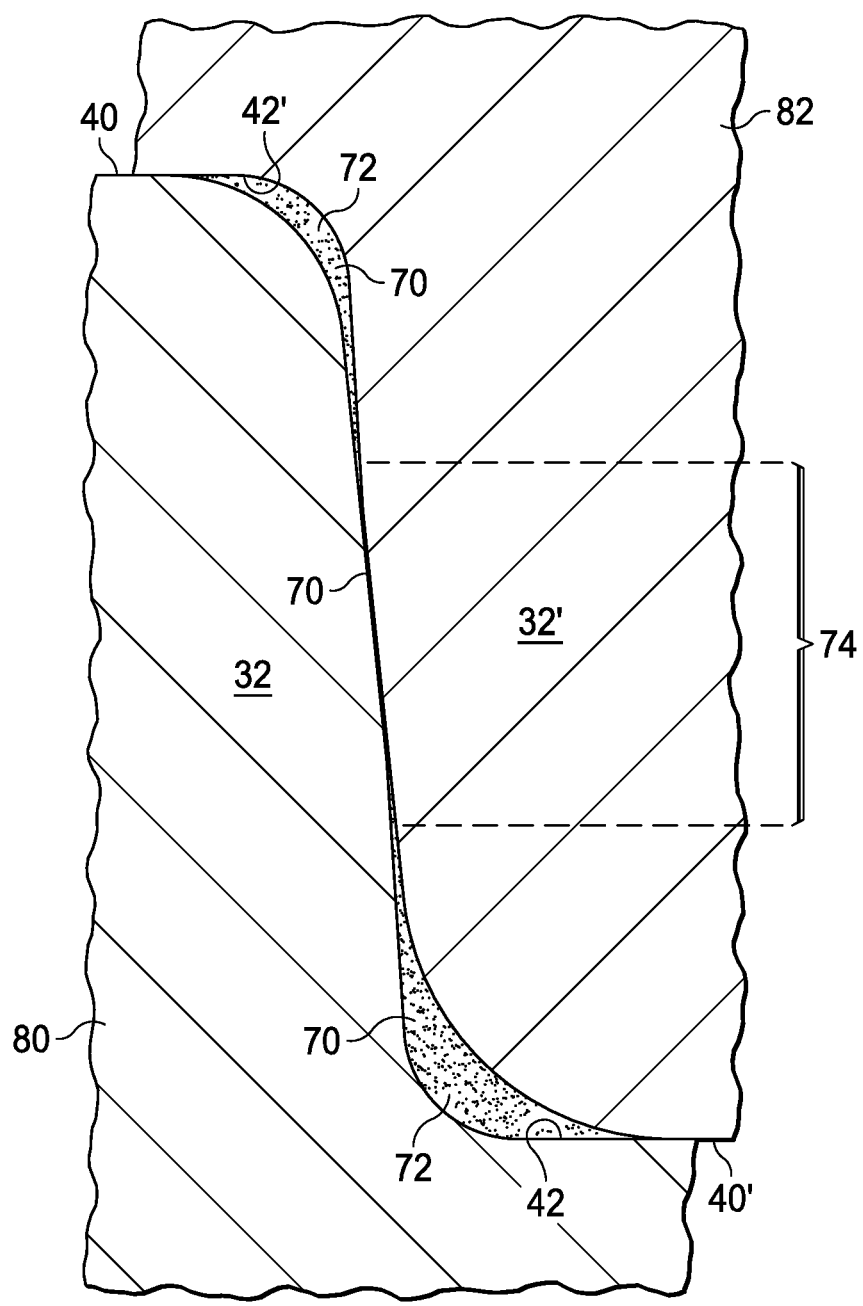
FIG. 6 is a schematic view of a stab flank in a fully made up connection.

FIG. 6 is an enlarged view of the stab flanks of the thread of FIG. 5 at full thread assembly. As shown in FIG. 6, thread compound 70 may still be disposed between ridges 32 of the pin 80 and the ridges 32' of the box 82. In some connections, the stab and load flanks may be intended to contact or interfere. The thread compound 70 applied during make-up may gather between voids of the two members, such as voids 72 which are formed between the angled surfaces of the stab and load flanks. However, due to various parameters such as the shape of the threadforms and the quantity, location, and properties of the thread compound 70, thread compound 70 may remain between thread flank surfaces that are intended to contact or interfere, such as between the intended contact area 74. The contact or interference of thread flank surfaces may be intended to increase pressure strength of the made-up connection. However, the containment and/or compression of thread compound 70 between surfaces of two engaging tubular members around an intended contact area 74 (sometimes referred to as dope entrapment), may potentially alter or decrease the pressure strength and performance of an engaged connection under certain circumstances.

In one or more embodiments of the present techniques, the threadforms of the pin member 80, the box member 82, or both, may be designed such that when the two tubular members are fully made up, a clearance remains between the crests and roots of the pin member 80 threads and box member 82 threads. This clearance, which may also be described as a void, pocket, recess, space, area, etc., may provide relief from thread compound entrapment, as the thread compound may gather within this intentional clearance space, rather than remaining disposed between thread surfaces that are intended to contact or interfere. The present embodiments of threadforms having thread compound relief spaces may have areas designed to contain more thread compound than a typical threadform. Thread compound may be displaced to these relief spaces, thereby decreasing the amount of thread compound remaining between thread surfaces intended to contact, and increasing pressure strength and other performance parameters.

FIGS. 7-10 depict a tubular connection make-up sequence representing one or more embodiments of the present techniques, where the pin member 80 and/or the box member 82 are designed with thread compound relief spaces 90 between the crests 40 and roots 42 of the two members 80 and 82. The relief spaces 90 include an increase in clearance between the crests 40 and roots 42 compared to a typical threadform, and may refer to threadform designs where a clearance between crests 40 and roots 42 is intended to remain after the pin and nose member is fully made-up. In some embodiments, the crests 40 and roots 42 may not be in contact even when tubular members are made-up. In accordance with the present techniques, tubular members are made-up, engaged, or connected, when all ridges 32 of a pin 80 or box 82 are positioned within groove segments 34 of a mating box 82 or pin 80. In other words, the tubular members are made up when the length of the threading on the pin 80 substantially overlap with the length of the threading on the box 82.

The make-up sequence may involve rotating one member, for example, the pin member 80, towards and with respect to the other member, for example, the box member 82. The number of turns or rotation of one threaded member into the other threaded member producing the assembly sequence may vary with the geometric proportions of the individual threadform used for the members. The make-up sequence may further involve the application of thread compound 70, which may be displaced between the pin member 80 and box member 82 during make-up. While the thread compound 70 is depicted as disposed over the pin member 80, it should be noted that thread compound 70 may be applied to the pin member 80, the box member 82, or both, in various quantities.

Figure 7:
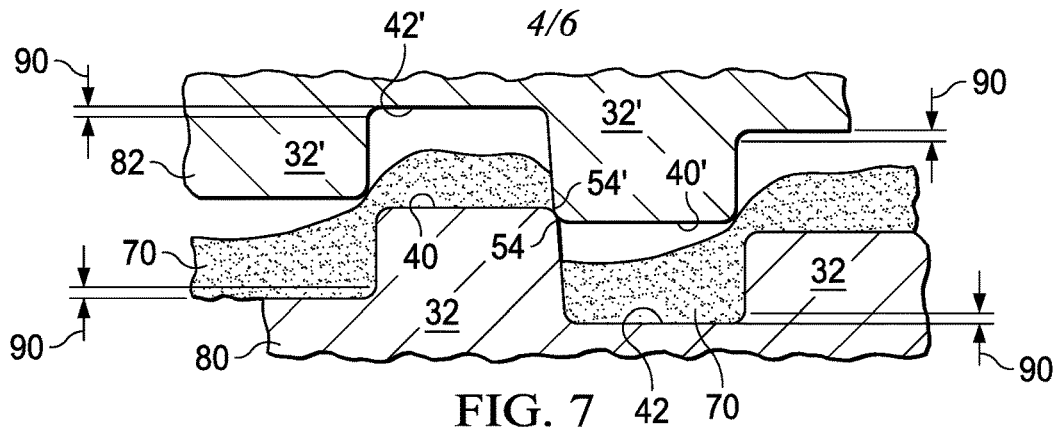
FIGS. 7-10 are schematic views of threads during the makeup sequence of members, in accordance with embodiments of the present techniques.
Figure 8:
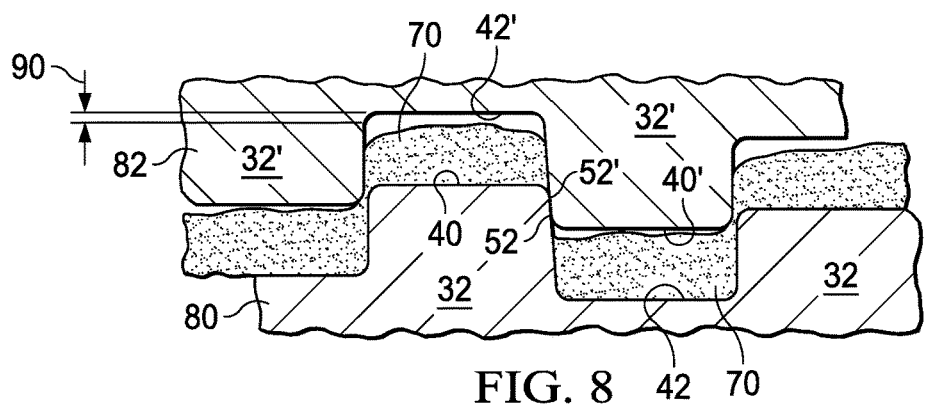

During the first turn, as depicted in FIG. 7, the stab flank engagement is between the clearance surfaces 54, 54' of the two threaded members, and thread compound 70 may be disposed between the crest 40 of the pin 80 and root 42' of the box 82 and/or between the root 42 of the pin 80 and crest 40' of the box 82. The load flanks may be drawn closer together as the thread is rotated into closer engagement. If the thread of the members has a cam surface 52, 52', as shown, as the threaded assembly enters its second turn as shown in FIG. 8, stab flank contact shifts from the clearance surfaces 54, 54' to the cam surfaces 52, 52'. If not, assembly during the second turn remains on the clearance flank.

Figure 9:
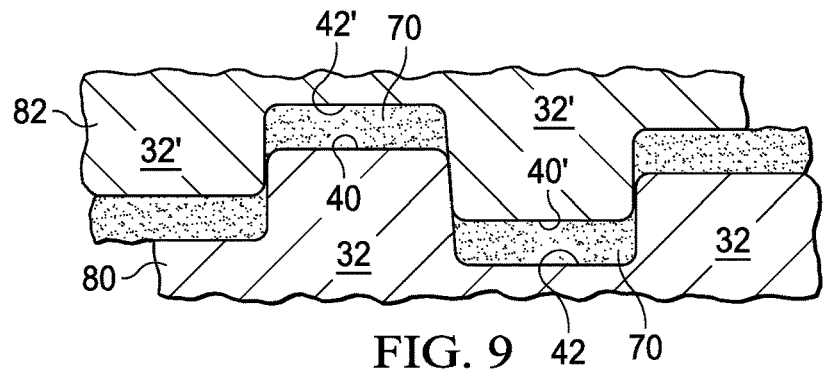
Figure 10:
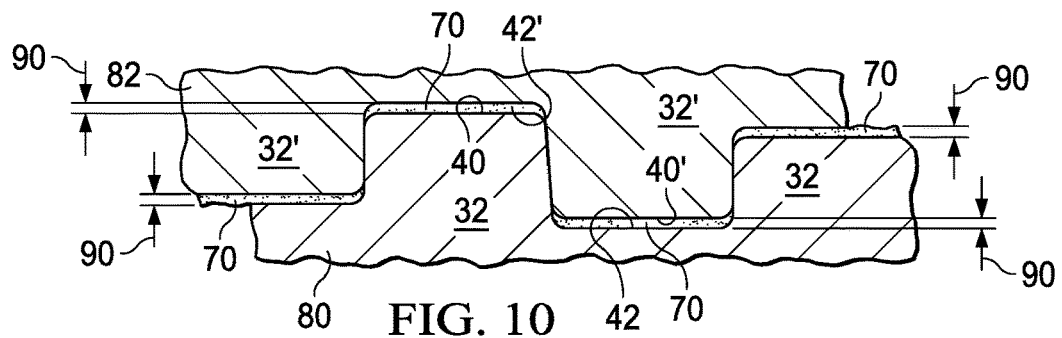

As shown in FIG. 8, the load flanks may be drawn closer together as the thread is rotated into closer engagement. Due to the relief spaces 90, the thread compound 70 may have more space between the crest 40 of the pin 80 and root 42' of the box 82 and/or between the root 42 of the pin 80 and crest 40' of the box 82 than it would have in a connection having a typical threadform. As illustrated in FIG. 9, at the end of the second turn, the clearance is further decreased. Thread compound 70 may almost fill the clearance between the crest 40 of the pin 80 and root 42' of the box 82 and/or between the root 42 of the pin 80 and crest 40' of the box 82. As the connection enters its third turn, the thread groove and thread ridge's load flanks engage, or are moved into substantive contact, as depicted in FIG. 10. Thread compound 70 may be displaced from the stab and load flanks of the threadforms and may instead be contained in the thread compound relief areas 90 between the pin 80 and box 82. As shown in FIG. 10, thread compound relief areas 90 may extend throughout the axial length of pin 80 and box 82. In other words, a thread compound relief area 90 may exist between each crest 40 of pin 80 and root 42' of box 82, and also between each crest 40' of box 82 and root 42 of pin 80. This pattern forms, in effect, a continuous thread compound relief area extending from one end of the connection to the other. In this way, the design of an embodiment of the present invention provides substantially greater volume for thread compound relief than prior designs.

Figure 11:
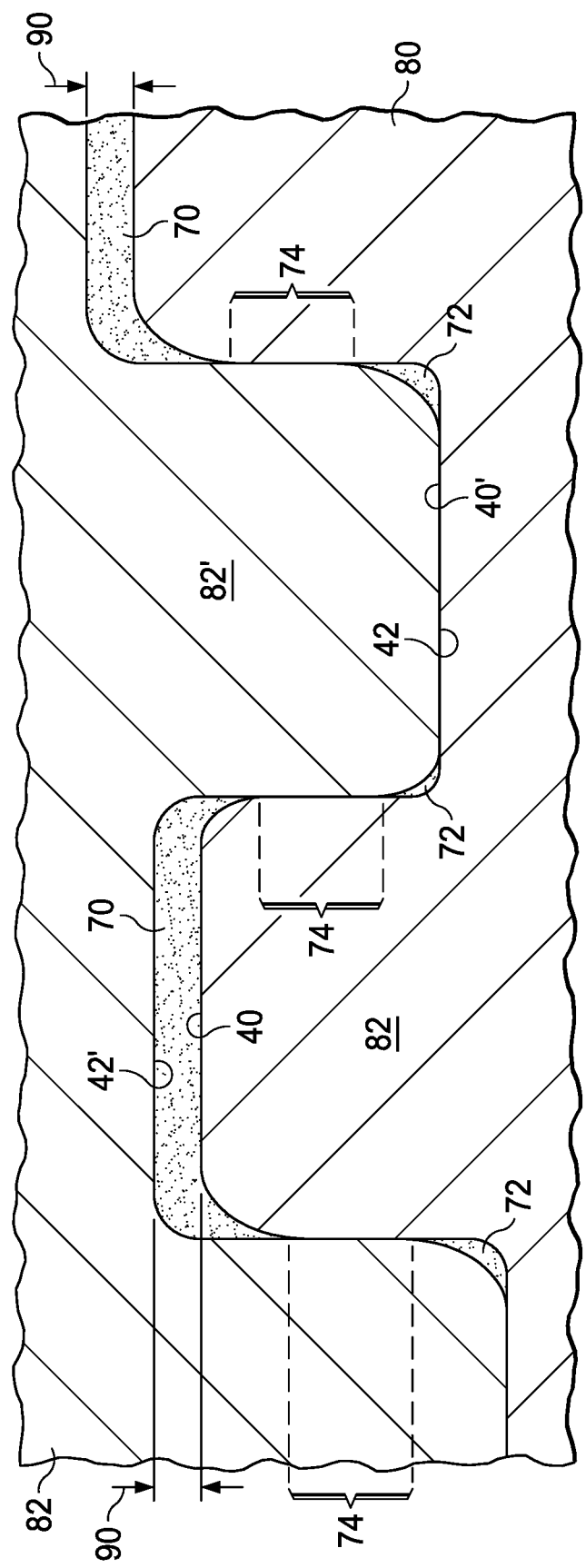
FIG. 11 is a schematic view of one embodiment of a threadform having thread compound relief between the crest and root of two connected members of a connection.

FIG. 11 depicts one or more embodiments of a threadform having thread compound relief areas between the crest 40 of the pin 80 and the root 42' of the box 82. As shown in FIG. 11, thread compound 70 may be substantially contained in the thread compound relief areas between the crest 40 of the pin 80 and root 42' of the box 82. In some connections, the stab and load flanks may be intended to contact or interfere. The thread compound 70 applied during make-up may displace from the flanks of the pin 80 and box 82 and may gather between voids of the two members, such as the voids 72 formed between the angled surfaces of the stab and load flanks. Additionally, thread compound 70 may be contained in the thread compound relief areas 90 between the crest 40 of the pin 80 and root 42' of the box 82. In accordance with the present techniques, the amount of space available to contain thread compound 70 may be sufficient to contain thread compound 70 such that intended contact areas 74 of surfaces of two engaging tubular members may contact or interfere as intended.

It should be appreciated that the thread compound relief areas 90 of the present techniques may involve any combination of lowering the height of the crest 40 of the pin 80, extending the depth of a root 42 of the pin 80, lowering the height of the crest 40' of the box 82, and extending the depth of the root 42' of the box 82. As used herein, lowering the height of the crest refers to a decreased height of the crest such that a clearance or space remains between the crest and the root it mates with once the tubular member is fully engaged. Likewise, extending the depth of the root refers to an increased depth of the root such that a clearance or space remains between the root and the crest it mates with once the tubular member is fully engaged.

For example, one or more embodiments depicted in FIG. 10 may include lowering the height of the crest 40 of the pin 80 and/or extending the depth of the root 42' of the box 82, as well as extending the depth of the root 42 of the pin 80 and/or lowering the height of the crest 40' of the box 82. As shown in FIG. 10, the made-up pin and box members 80 and 82 have thread compound relief areas 90 between both the crest 40 of the pin 80 and the root 42' of the box 82 and the root 42 of the pin 80 and the crest 40' of the box 82. However, one or more embodiments depicted in FIG. 11 may include only lowering the height of the crest 40 of the pin 80 and/or extending the depth of the root 42' of the box 82, as the made-up pin and box members 80 and 82 have thread compound relief areas 90 only between the crest 40 of the pin 80 and the root 42' of the box 82. Likewise, other embodiments of the present techniques may include only extending the depth of the root 42 of the pin 80 and/or lowering the height of the crest 40' of the box 82 such that made-up pin and box members 80 and 82 have thread compound relief areas 90 between the root 42 of the pin 80 and the crest 40' of the box 82.

Figure 12:
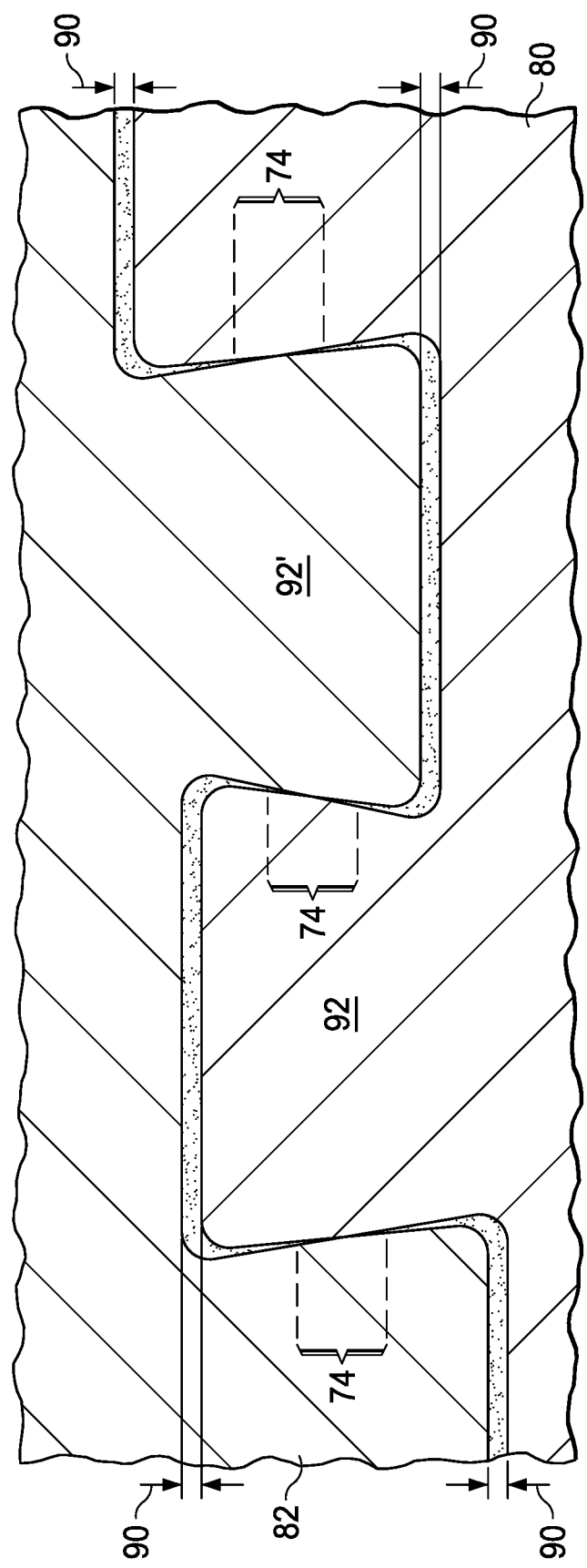
FIG. 12 is a schematic view of one embodiment of the invention having a wedge threadform.

While square or near-square threadforms are depicted in the present disclosure, it should be noted that the present techniques of including a space between the crest and root of a connected pin and box to contain thread compound may be applicable to other thread shapes, including buttress threads, wedge threads, or any other threads having an approximate crest portion and root portion in the threadform. For example, FIG. 12 represents one or more embodiments having a wedge threadform. Certain features of different embodiments may be combined depending on the shape of the threadform. For example, the thread ridges 92 and 92' of the pin 80 and box 82, respectively, may each have angled stab and load flanks. A connection having a wedge threadform may have thread compound relief areas 90 between both the crest 40 of the pin 80 and the root 42' of the box 82 and the root 42 of the pin 80 and the crest 40' of the box 82 while maintaining sufficiently high pressure strength, due to the angled flank configuration of the wedge threadform.

The threaded tubular connection of the present application may further be used in an integral joint or in a coupled joint for tubular members. In an integral joint the pin and box members are joined integrally to the ends of the tubular members. In a coupled joint, a threaded coupling joins the threaded ends of the tubular members. The threaded tubular connection of the present invention is also applicable to all types of oil field tubulars including drill pipe, casing, and tubing. The connection may be used on plain end pipe, cold formed swaged ends, or hot forged upset ends.

Furthermore, in various embodiments, the thread compound relief area 90 size may vary depending on the shape of the tubular member threadforms. In some embodiments, a height of the thread compound relief area 90 may be approximately 5% to 40% of the height of the groove segment that contains it, or in some embodiments, 5% to 20% of the height of the groove segment that contains it. Additionally, in some embodiments, the thread compound relief area 90 size may be a function of a ratio of a height of side flanks of a pin member 80 with respect to a height of side flanks of a box member 82. For example, in some embodiments, the side flanks of a pin member 80 may have a height that is 60% to 95% the height of the side flanks of a box member 82, or the side flanks of a box member 82 may have a height that is 60% to 95% of the height of the side flanks of a pin member 80, or both. Additionally, the size of the thread compound relief areas 90 may vary throughout the length of threading on a pin member 80 and a box member 82.

In some embodiments, the tubular connection is typically included in the broad group identified as slim-line, high performance connections. The connection may be used in various embodiments such as integral flush-joint, with or without crimped sections, integral swaged with or without swaged sections, hot-forged upset on one or both members, or coupled with or without crimped pin ends. For either an integral or coupled connection, it is envisioned that the threadforms can be used in conjunction with other common premium connection features such as, without limitation, one or more metal seals (both internal and external), one or more torque shoulders for positive position stop (inside, outside, or center), and run-in/run-out threads.

Many modifications and other implementations set forth herein will be apparent having the benefit of the teachings presented in the foregoing descriptions and the associated drawings. Therefore, it is to be understood that the systems and methods described herein are not to be limited to the specific implementations disclosed and that modifications and other implementations are intended to be included within the scope of the appended claims. Although specific terms are employed herein, they are used in a generic and descriptive sense and not for purposes of limitation.

The invention claimed is:

1. A connection comprising:
   a first tubular member comprising a first screw threadform defined by a first plurality of crests, a first plurality of roots, and a first plurality of flanks, wherein each flank separates each crest from each root, and wherein the first plurality of crests and roots are substantially axial to the first tubular member and the first plurality of flanks are substantially radial to the first tubular member; and
   a second tubular member comprising a second screw threadform defined by a second plurality of crests, a second plurality of roots, and a second plurality of flanks, wherein each flank separates each crest from each root, and wherein the second plurality of crests and roots are substantially axial to the second tubular member and the second plurality of flanks are substantially radial to the second tubular member;
   wherein the first tubular member and the second tubular member are configured to connect when the first threadform engages with the second threadform; and
   wherein a first plurality of thread compound relief spaces is formed between each of the first plurality of crests and each of the second plurality of roots, throughout the axial length of the first and second screw threadforms;
   wherein the first tubular member comprises a pin end and the second tubular member comprises a box end, and the thread compound relief spaces are formed between crests of the pin end and roots of the box end; and
   wherein the thread compound relief spaces comprise an axial height that is 5% to 10% of an axial height of the first plurality of flanks.

2. The connection of claim 1, wherein the first plurality of roots and the second plurality of crests come into direct contact when the first and second tubular members are connected.

3. The connection of claim 1, wherein the thread compound relief spaces comprise an axial height that is 5% to 10% of an axial height of the second plurality of flanks.

4. The connection of claim 1, wherein a second plurality of thread compound relief spaces is formed between each of the second plurality of crests and each of the first plurality of roots throughout the axial length of the first and second threadforms, such that the first plurality of thread compound relief spaces and second compound relief spaces combine to form a substantially continuous void between the corresponding roots and crests throughout the axial length of the first and second screw threadforms.

5. The connection of claim 1, wherein a contact region forms between a portion of the first plurality of flanks and a portion of the second plurality of flanks when the first and second tubular members connect.

6. The connection of claim 1, wherein the first plurality of thread compound relief spaces is formed by making the axial height of the first plurality of flanks less than the axial height of the second plurality of flanks.

* * * * *